(12) United States Patent
Chuang et al.

(10) Patent No.: US 8,229,226 B2
(45) Date of Patent: Jul. 24, 2012

(54) REAL-TIME MOTION RECOGNITION METHOD AND INERTIA-SENSING AND TRAJECTORY-RECONSTRUCTION DEVICE USING THE SAME

(75) Inventors: Fang-Chen Chuang, Tainan County (TW); Guo-Yuan Zeng, Taipei (TW); Gwo-Yun Lee, Fonghsan (TW); Hsuan-Lih Lin, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 861 days.

(21) Appl. No.: 12/355,073

(22) Filed: Jan. 16, 2009

(65) Prior Publication Data

US 2010/0033352 A1    Feb. 11, 2010

(30) Foreign Application Priority Data

Aug. 8, 2008   (TW) .............................. 97130345 A (51) Int. Cl.
*G06K 9/00* (2006.01)
(52) U.S. Cl. ........................ 382/188; 382/189
(58) Field of Classification Search .................. 382/188, 382/189
See application file for complete search history.

(56) References Cited

U.S. PATENT DOCUMENTS

| | | |
|---|---|---|
| 5,022,086 A | 6/1991 | Crane et al. |
| 5,029,223 A | 7/1991 | Fujisaki |
| 5,215,397 A | 6/1993 | Taguchi et al. |
| 5,902,968 A | 5/1999 | Sato |
| 5,923,793 A | 7/1999 | Ikebata |
| 5,981,884 A | 11/1999 | Sato et al. |
| 6,084,577 A | 7/2000 | Sato et al. |
| 6,628,847 B1 | 9/2003 | Kasabach |
| 6,941,239 B2* | 9/2005 | Unuma et al. ............... 702/141 |
| 2001/0038711 A1 | 11/2001 | Williams et al. |
| 2002/0067350 A1 | 6/2002 | Ben Ayed |
| 2002/0145596 A1* | 10/2002 | Vardi ............................ 345/179 |
| 2004/0140964 A1 | 7/2004 | Wang et al. |
| 2004/0184659 A1 | 9/2004 | Bang |
| 2004/0260468 A1* | 12/2004 | Bang et al. .................... 701/220 |
| 2006/0088215 A1 | 4/2006 | Milner |
| 2006/0182316 A1* | 8/2006 | Bang et al. .................... 382/122 |

(Continued)

FOREIGN PATENT DOCUMENTS

CN    1241743 A    1/2000

(Continued)

OTHER PUBLICATIONS

Jing Yang et al., Analysis and Compensation of Errors in the Input Device Based on Inertial Sensors, in Proc. Conf. Information Technology Coding and Computing, 2004, p. 790-796, vol. 2.

(Continued)

*Primary Examiner* — Timothy Edwards, Jr.
(74) *Attorney, Agent, or Firm* — Morris Manning & Martin LLP; Tim Tingkang Xia, Esq.

(57) ABSTRACT

The present invention provides a real-time motion recognition method for identifying whether an inertia-sensing device is in active state or not according to an angular velocity signal detected with respect to the device. The present invention further provides an inertia-sensing and trajectory-reconstruction device incorporated with the foregoing method for recording detected acceleration and angular velocity signals while the device is in operation so as to reconstruct a corresponding trajectory which is capable of being subsequently utilized to be a basis of writing recognition and motion analysis.

22 Claims, 7 Drawing Sheets

U.S. PATENT DOCUMENTS

2007/0038711 A1    2/2007    MacBeth

FOREIGN PATENT DOCUMENTS

| CN | 1328642 A | 12/2001 |
| CN | 1996205 A | 7/2007 |
| CN | 1996208 A | 7/2007 |

OTHER PUBLICATIONS

Won-Chul Bang et al., Self-Contained Spatial Input Device for Wearable Computers, In Proc. of the 7th IEEE Int. Symposium on Wearable Computers(ISWC'03), Oct. 2005, p. 26-34.

* cited by examiner

REAL-TIME MOTION RECOGNITION METHOD AND INERTIA-SENSING AND TRAJECTORY-RECONSTRUCTION DEVICE USING THE SAME

CROSS-REFERENCE TO RELATED APPLICATIONS

This non-provisional application claims priority under 35 U.S.C. §119(a) on Patent Application Ser. No. 097130345 filed in Taiwan on Aug. 8, 2008, the entire contents of which are hereby incorporated by reference.

BACKGROUND OF THE INVENTION

1. Field of the Invention

The present invention generally relates to an inertia-sensing technology and, more particularly, to a real-time motion recognition method and an inertia-sensing and trajectory-reconstruction device using inertia-sensing signals to perform change-point detection and trajectory reconstruction recognition.

2. Description of the Prior Art

With the advancement in technology, the modern life is closely connected with information technology products. Among them, computers and handsets are especially used in the daily life. The user uses these computers technology products to send commands to the computer to show results on the display after the commands have been processed and/or transferred. In such a process, an input interface is required for communicating the user and the computer.

The keyboard and the mouse are the most popular user interfaces. Generally, the mouse is function-limited and cannot process complicated instructions, while the keyboard requires a time-consuming training process. Moreover, it is difficult or time-consuming to realize delicate drawing and processing by using the keyboard or the mouse. Therefore, other input schemes such as handwriting and voice have been developed. On the other hand, with the rapid development in multi-media technology, the technology of the user interface interacted with the multi-media has launched. Generally, the user interface interacted with the multi-media uses a sensor capable of detecting the acceleration or the angular velocity. The development in the technology of determining the start and the end of the sensor has been intensively reported.

The conventional handwriting technology specialized in motion identification can be divided into several categories. Firstly, in U.S. Pat. No. 5,902,968, a handwriting device using button-free sensing is disclosed, wherein accelerometers and gyroscopes are used to detect a state of handwriting or non-handwriting. The handwriting device compensates for the effects of the inclination angle of a pen shaft when writing so as to obtain the movement distance. Whether the device is in motion is determined based on whether the signals of the accelerometers and gyroscopes are above 10 Hz. If the signals are above 10 Hz, the handwriting device is in a handwriting state and compensates for the effects of the inclination angle of a pen shaft when writing so as to obtain the movement distance. Moreover, in U.S. Pat. Pub. No. 2004/0184659, a handwriting trajectory recognition system and method are disclosed. The handwriting trajectory recognition system comprises: a motion detection unit adapted to output electric signals based on changes in acceleration of a body of the system in space and a control unit adapted to detect non-stroke regions intervals where the motions of the system body are temporarily stopped and recover handwritings based on the electric signals.

Secondly, in U.S. Pat. Pub. No. 2002/0067350, a wireless handwriting device using button-type sensing is disclosed. When the user pushes a button to start wireless transmission so that the processor compares the acceleration parameters from accelerometer with a stored acceleration sequence to perform recognition and then a Blue-Tooth transmitter transmits information to the terminator. Whether the device is in writing state is determined based on whether the user pushes the button to perform recognition.

Thirdly, in U.S. Pat. Pub. No. 2006/0088215, a handwriting recognition system using a pressure gauge to detect and determine whether the system is in motion is disclosed. A pressure gauge is disposed at the front of the handwriting recognition system to determine whether the handwriting recognition system contacts the handwriting surface and separate trajectory signals and non-writing signals. The handwriting trajectory is then calculated based on the acceleration and the change-point of the handwriting signal is detected according to the pressure gauge. Moreover, in U.S. Pat. No. 6,628,847, a pressure gauge is disposed on the stylus to determine whether the handwriting recognition system contacts the handwriting surface and separate trajectory signals and non-writing signals.

Fourthly, in U.S. Pat. No. 5,923,793, a handwriting device is disclosed, wherein whether the stylus contacts a handwriting plate determines whether the handwriting device is in a handwriting or non-handwriting state. When the user writes on the handwriting plate, the handwriting device determines the position of the stylus in a specific region and the handwriting characteristics are stored in a memory for recognition. Since the stylus contacts the handwriting plate to determine the start point of handwriting, only 2-D handwriting can be identified. Moreover, U.S. Pat. Pub. No. 2007/0038711 also discloses a handwriting and recognition device for 2-D handwriting.

SUMMARY OF THE INVENTION

The present invention provides a real-time motion recognition method using an angular velocity signal to determine the start and the end of a motion signal to reduce the time for inertia recognition to precisely determine the motion period in real-time.

The present invention provides a real-time motion recognition method using an angular velocity signal to determine the start and the end of a motion signal. Since the angular velocity sensing device is independent of the gravity, the reference value for determining the motion state will not change due to the user's gesture. Therefore, the accuracy of determining the motion state can be improved and the determining process can be simplified.

The present invention provides an inertia-sensing and trajectory-reconstruction device using an angular velocity signal to determine the start and the end of a motion signal to construct a trajectory corresponding to the motion signal for character recognition or motion analysis according to the trajectory.

In one embodiment, the present invention provides a real-time motion recognition method, comprising steps of: acquiring an angular velocity signal generated according to a motion of an inertia-sensing device; comparing the angular velocity signal with a threshold range; and determining the inertia-sensing device is in motion if the angular velocity signal exceeds the threshold range.

In another embodiment, the present invention further provides an inertia-sensing and trajectory-reconstruction device, comprising: an inertia-sensing unit, capable of detecting an acceleration signal on at least one axis and an angular velocity signal on at least one axis; and a motion-operating unit, electrically connected to the inertia-sensing unit, the motion-operating unit further comprising: a motion change-point detection unit, determining whether the inertia-sensing and trajectory-reconstruction device is in motion according to the angular velocity signal on at least one axis; and a trajectory reconstruction-operating unit, capable of performing trajectory reconstruction to construct a trajectory according to the acceleration signal on at least one axis detected by the inertia-sensing unit while the inertia-sensing and trajectory-reconstruction device is in motion.

BRIEF DESCRIPTION OF THE DRAWINGS

The objects, spirits and advantages of various embodiments of the present invention will be readily understood by the accompanying drawings and detailed descriptions, wherein.

DETAILED DESCRIPTION OF THE PREFERRED EMBODIMENT

The present invention can be exemplified but not limited by the embodiments as described hereinafter.

Figure 1A:
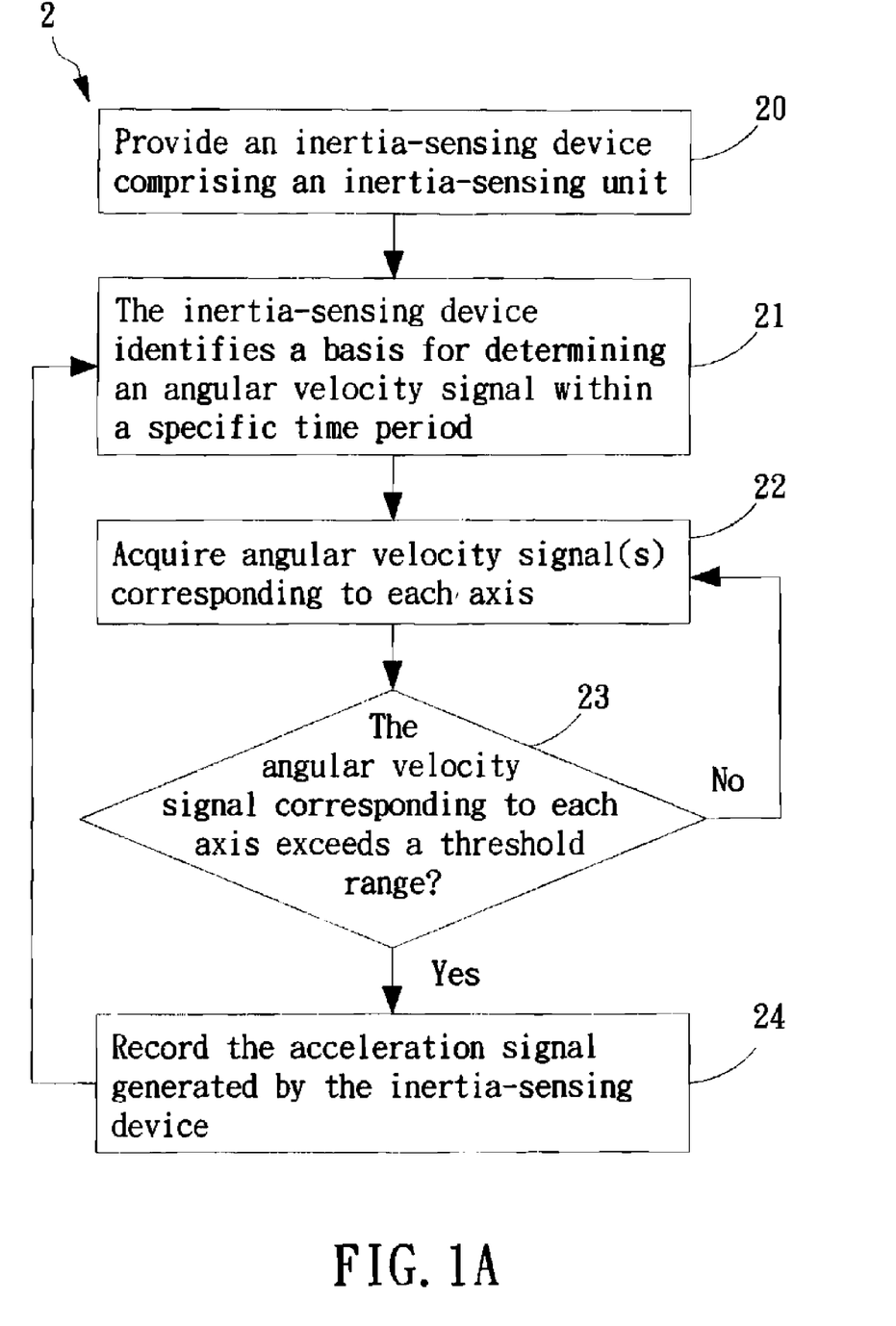
FIG. 1A is a flowchart of a real-time motion recognition method according to the present invention.

Please refer to FIG. 1A, which is a flowchart of a real-time motion recognition method according to the present invention. In the present embodiment, the objective of the real-time motion recognition method is to identify whether the motion-sensing device comprising an inertia-sensing device is in operation, and to record the detected signal generated when the motion-sensing device is in motion as a basis of trajectory reconstruction and recognition. The method 2 comprises steps hereinafter. First, in Step 20, an inertia-sensing device comprising an inertia-sensing unit is provided. The inertia-sensing unit comprises an accelerometer capable of detecting tri-axial (X, Y, Z) motion state and a gyroscope capable of detecting tri-axial (Wx, Wy, Wz) rotational state. The accelerometer detects the acceleration signal generated when the inertia-sensing device is in motion, while the gyroscope detects the angular velocity signal generated when the inertia-sensing device is in motion.

Figure 1B:
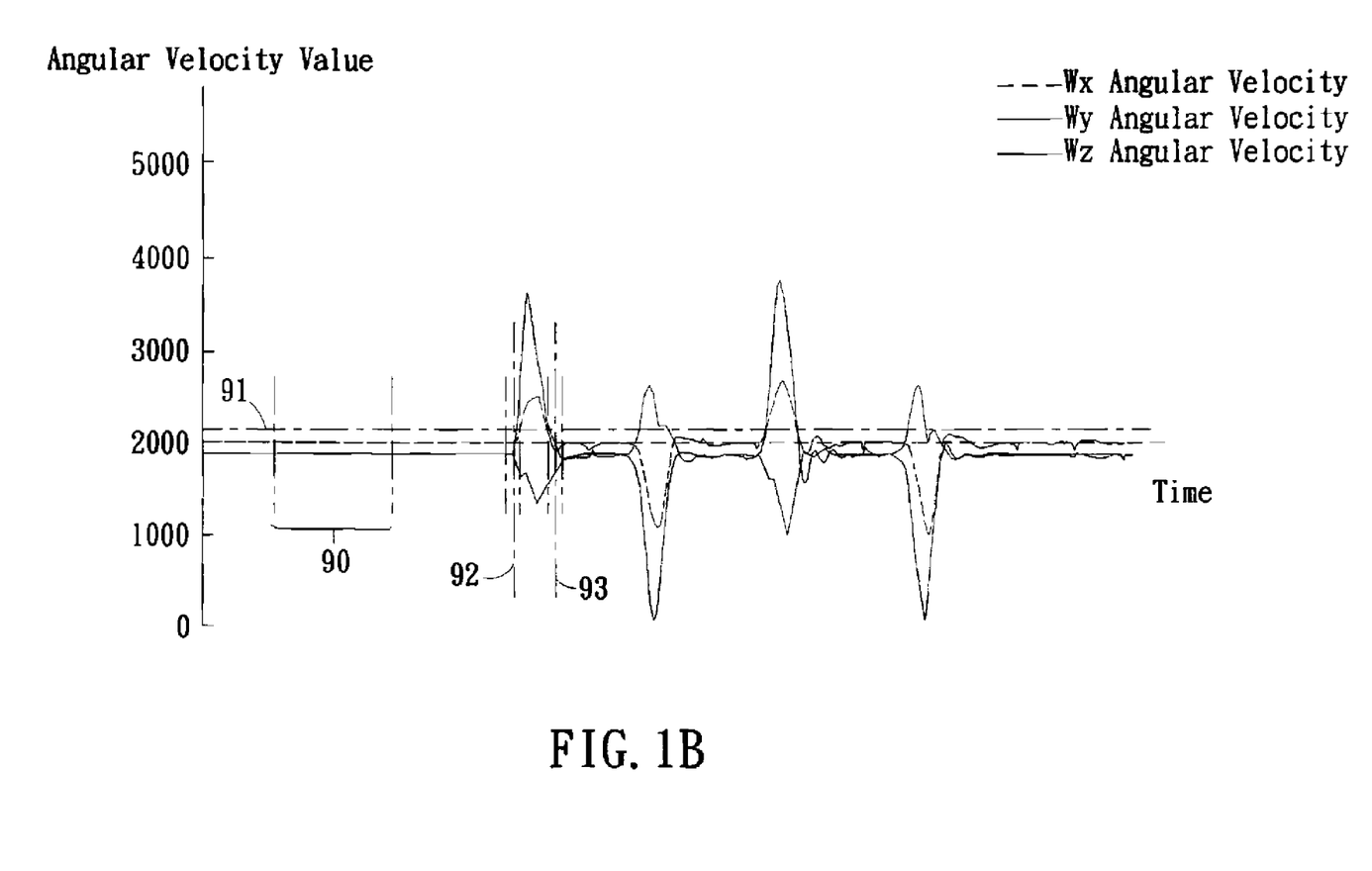
FIG. 1B is a graph showing the detected tri-axial (Wx, Wy, Wz) angular velocity signal.

Then in Step 21, the inertia-sensing device identifies a basis for determining an angular velocity signal within a specific time period. Since the gyroscope may be influenced by the temperature, the basis for determining an angular velocity signal may be varied under different environmental conditions. Therefore, within a specific time period, angular velocity signals are detected by the gyroscope and are averaged as a basis for determining whether the inertia-sensing device is in motion. For example, in the present embodiment, the detecting frequency is 100 Hz. Therefore, when the inertia-sensing device is idle or not in motion, the specific time period is set to 1 second. In other words, 100 angular velocity signals are recorded in each second and are averaged as a reference value for determination. Please refer to FIG. 1B, which is a graph showing the detected tri-axial (Wx, Wy, Wz) angular velocity signal. In region 90, 100 data of the detected angular velocity Wx, Wy, Wz are taken to provide a reference value 91 for determination.

Then in Step 22, the angular velocity signal corresponding to each axis is acquired. The angular velocity signal can be a single value or an average value of a plurality of angular velocity signals. To increase the accuracy, in Step 22, a plurality of angular velocity signals are acquired and averaged. The number of the angular velocity signals is determined according to practical demand. For example, in the present embodiment, 5 angular velocity signals are continuously acquired (which takes 0.05 sec) corresponding to the rotational state on each axis, and the 5 angular velocity signals are averaged to acquire the angular velocity signal corresponding to each axis. Then, in Step 23, the angular velocity signal is compared with a threshold range. The determination of the threshold range depends on the reference value plus or minus a specific value according to Step 21.

For example, in the present embodiment, the threshold range is defined by the reference value plus or minus 8 counts. The specific value depends on practical demand and is not limited to the embodiments of the present invention. If the angular velocity signal on one of the three axes is within the threshold range, it indicates that the inertia-sensing device is not in motion and the method returns to Step 22 to go on detecting. Otherwise, if all the three angular velocity signals on the three axes exceed the threshold range, it indicates that the inertia-sensing device is in motion, For example, in FIG. 1B, the tri-axial angular velocity signal between the labels 92 and 93 meets the requirement in Step 23. Therefore, label 92 represents the starting point and label 93 represents the ending point of the motion. When the inertia-sensing device is in motion, the method proceeds to Step 24 to record the acceleration signal generated by the inertia-sensing device. Certainly, during the recording process, Step 21 and Step 22 are performed to determine whether the motion of the inertia-sensing device has stopped.

Figure 2:
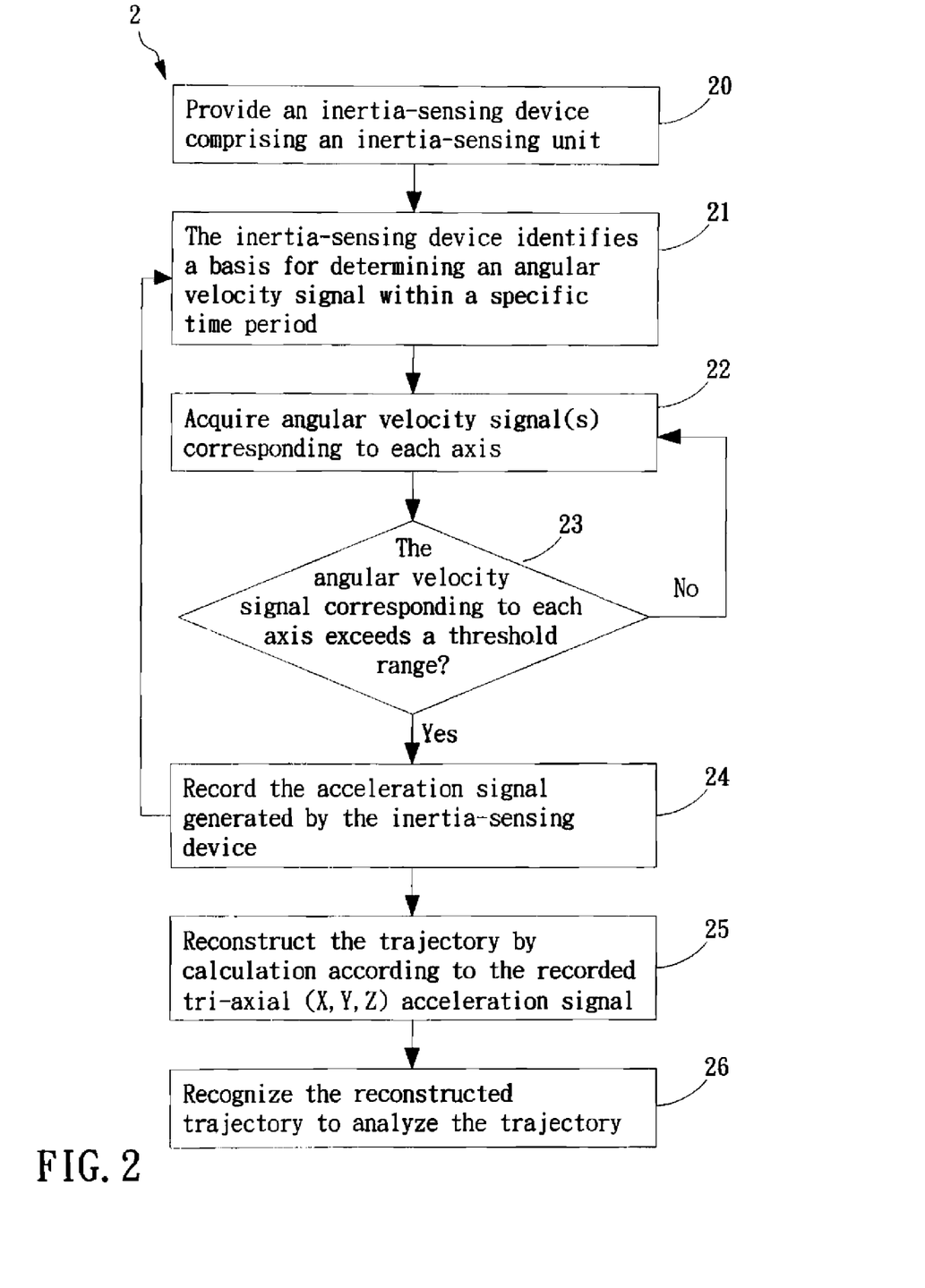
FIG. 2 is a flowchart of a real-time motion recognition method according to another embodiment of the present invention.
Figure 3A:
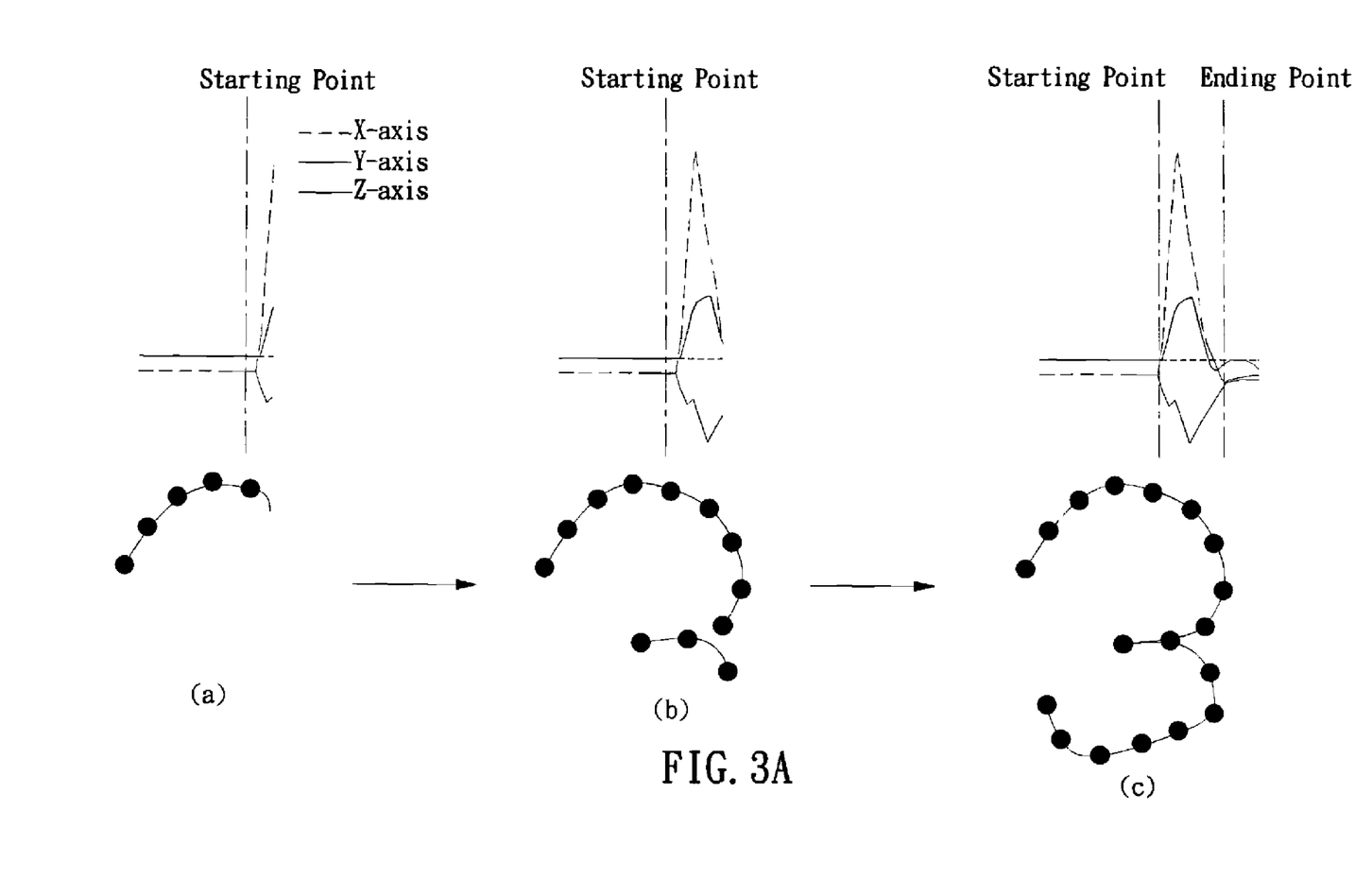
FIG. 3A to FIG. 3B are schematic diagrams showing trajectory reconstruction from acceleration signals.
Figure 3B:
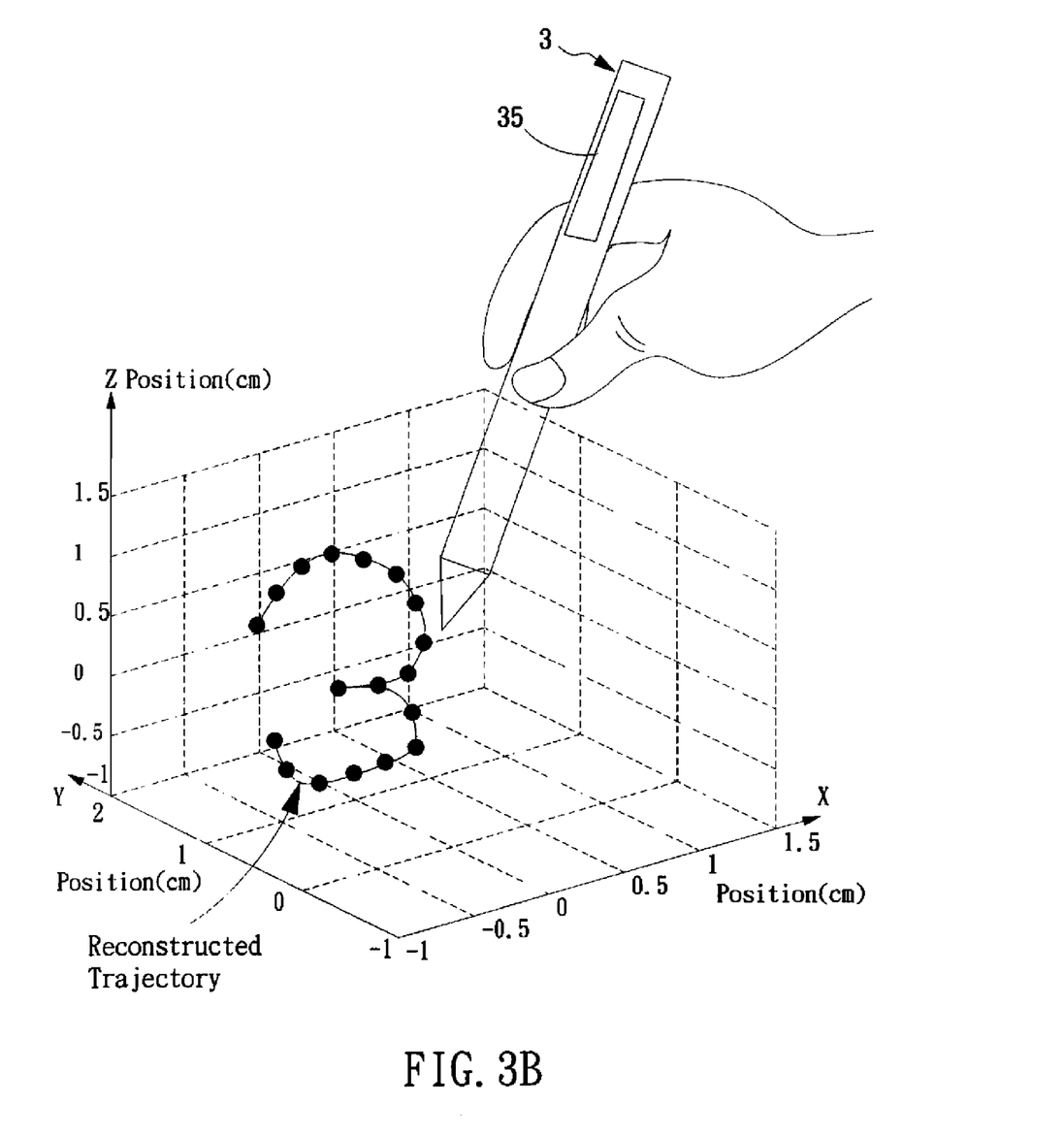

Please refer to FIG. 2, which is a flowchart of a real-time motion recognition method according to another embodiment of the present invention. In the present embodiment, the steps are similar to the steps in FIG. 1 except that the present embodiment further comprises steps for recognition of all the recorded acceleration signals. In FIG. 2, after recording the acceleration signal generated by the inertia-sensing device during motion, Step 25 is performed to reconstruct the trajectory by calculation according to the recorded tri-axial (X, Y, Z) acceleration signal. The calculation is conventionally well-known. In other words, the acceleration signal is calculated by integration to construct the trajectory of the inertia-sensing device. Please refer to FIG. 3A to FIG. 3B, which are schematic diagrams showing trajectory reconstruction from acceleration signals. In FIG. 3A to FIG. 3B, the 3-D acceleration signal detected during the motion of the inertia-sensing device is integrated to reconstruct the trajectory as shown in FIG. 3B.

Referring to FIG. 2, in Step 26, the trajectory reconstructed in Step 25 is recognized to analyze the trajectory. In Step 26, the applications can be various. In one embodiment, the trajectory recognition can be handwritten character recognition. In other words, the trajectory acquired in Step 25 can be viewed as a character trajectory so that the character can be recognized by comparing the trajectory with the existing information. Character recognition corresponding to the trajectory is conventionally well-known and has been intensively reported. Therefore, detailed description thereof is not provided herein. In another embodiment, trajectory recognition can be used to identify the motion of an athlete. For example, in baseball, pitching or swinging can be detected to acquire the trajectory by the inertia-sensing device. Therefore, in Step 25, the trajectory can be compared with ideal pitching or swinging so that the athlete can modify the pitching or swinging in real-time to improve his performance. Alternatively, in other sports (such as basketball, golf or gymnastics, but not limited thereto) or occasions wherein the trajectory can be used to evaluate the motion (such as digital movies wherein virtual animation production is achieved by constructing the 3-D trajectory of physical objects or physiotherapy wherein 3-D trajectory of human motions is used for rehabilitation analysis and artificial joint design), the flowchart in FIG. 2 of the present invention can be used for motion analysis and determination. It comprises at least an accelerometer and at least an angular velocity sensor.

Figure 4:
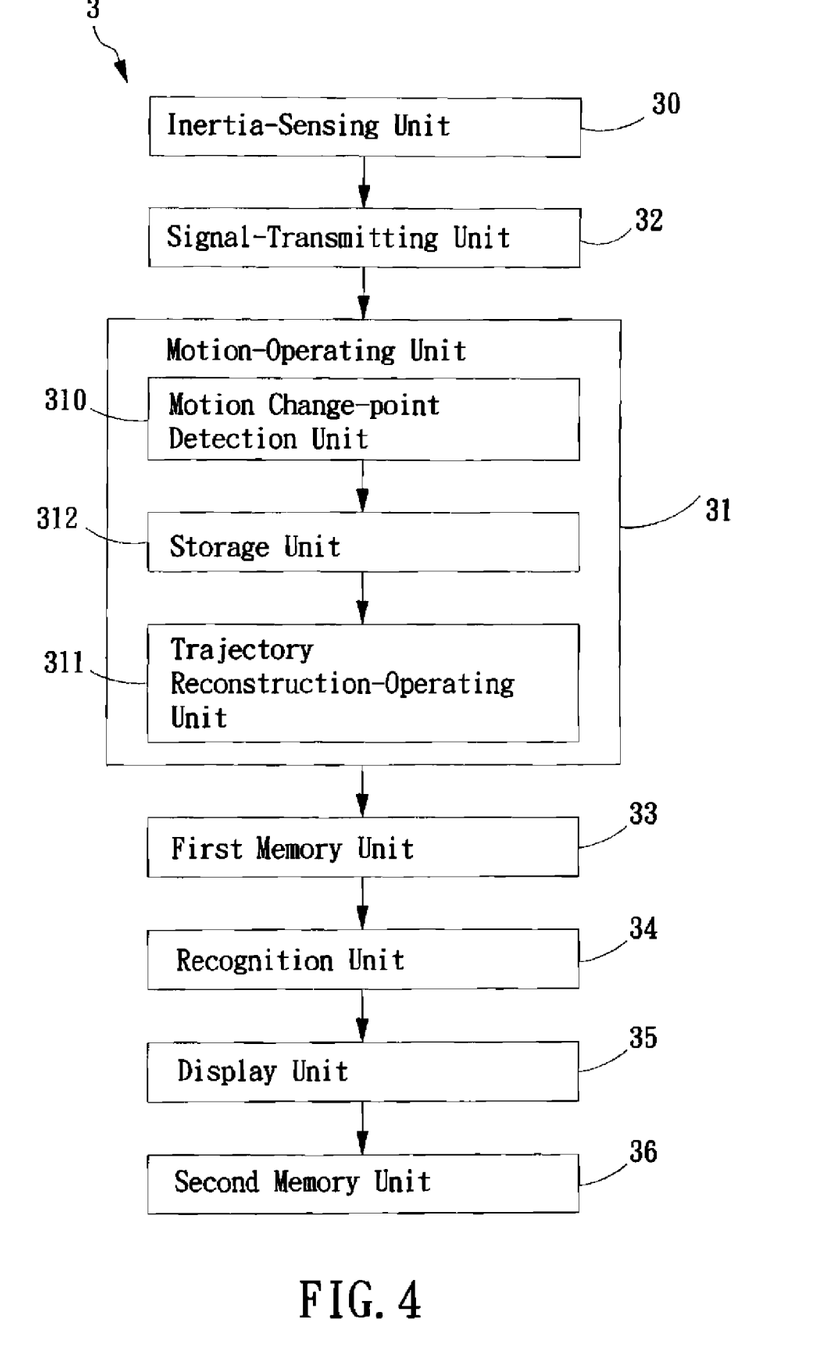
FIG. 4 is a block diagram of an inertia-sensing and trajectory-reconstruction device according to one embodiment of the present invention.

Please refer to FIG. 4, which is a block diagram of an inertia-sensing and trajectory-reconstruction device according to one embodiment of the present invention. The inertia-sensing and trajectory-reconstruction device 3 comprises an inertia-sensing unit 30 and a motion-operating unit 31. The inertia-sensing unit 30 is capable of detecting an acceleration signal on at least one axis and an angular velocity signal on at least one axis. In the present embodiment, the inertia-sensing unit 30 is an accelerometer capable of detecting the tri-axial motion state and an angular velocity sensor capable of detecting the tri-axial angular velocity. The angular velocity sensor is exemplified by, but not limited to a gyroscope.

The motion-operating unit 31 is electrically connected to the inertia-sensing unit 30 through a signal-transmitting unit 32. The electrical connection is made by wired or wireless transmission. In the present embodiment, the signal-transmitting unit 32 transmits detected signals to the motion-operating unit 31 by wireless transmission. The motion-operating unit 31 comprises a motion change-point detection unit 310 and a trajectory reconstruction-operating unit 311. The motion change-point detection unit 310 determines whether the inertia-sensing and trajectory-reconstruction device 3 is in motion according to the angular velocity signal on at least one axis. In the present embodiment, the determining steps of the motion change-point detection unit 310 are performed according to the steps in FIG. 1 to determine whether the inertia-sensing and trajectory-reconstruction device 3 is in motion. The trajectory reconstruction-operating unit 311 constructs the trajectory according to tri-axial acceleration signal detected by the inertia-sensing unit 30 when the inertia-sensing and trajectory-reconstruction device 3 is in motion. Trajectory reconstruction has been described in Step 24 in FIG. 2. In other words, the tri-axial acceleration signal is integrated to construct the trajectory, as shown in FIG. 3A and FIG. 3B.

The motion-operating unit 31 further comprises a storage unit 312 capable of recording the acceleration signal and the angular velocity signal detected by the inertia-sensing unit 30. For example, in (a) of FIG. 3A, the trajectory acquired by integrating the tri-axial (X, Y, Z) acceleration signal from the starting point of the motion is shown when the motion starts and the inertia-sensing and trajectory-reconstruction device 3 is determined to be in motion by the angular velocity signal. In (b) of FIG. 3A, the result of integrating the acceleration signal during handwriting or motion of the inertia-sensing and trajectory-reconstruction device 3 is shown. When the angular velocity signal is within the threshold range, it is determined that the motion is stopped. Therefore, the acceleration signal is integrated until the ending point of the motion. The trajectory from the starting point to the ending point of the motion is shown in (c) of FIG. 3A. Moreover, FIG. 3B shows the trajectory of 3-D handwriting.

The motion-operating unit 31 is further connected to a first memory unit 33 to record the trajectory reconstructed by the trajectory reconstruction-operating unit 311. Furthermore, the inertia-sensing and trajectory-reconstruction device 3 further comprises a recognition unit 34 coupled to the first memory unit 33 to read the trajectory recorded in the first memory unit 33 and recognize a corresponding character according to the trajectory. The recognition unit 34 is further coupled to a display unit 35 to display the recognized character by the recognition unit 34. The display unit 35 is integrated on the housing of the inertia-sensing and trajectory-reconstruction device 3, as shown in FIG. 3B. The display unit 35 is implemented by, but not limited to, a LCD or a LED display. In another embodiment, the display unit 35 is an independent display is connected to the recognition unit 34 by wired or wireless transmission. On another hand, the recognition unit 34 is further connected to a second memory unit 36 to record the recognized character.

Figure 5:
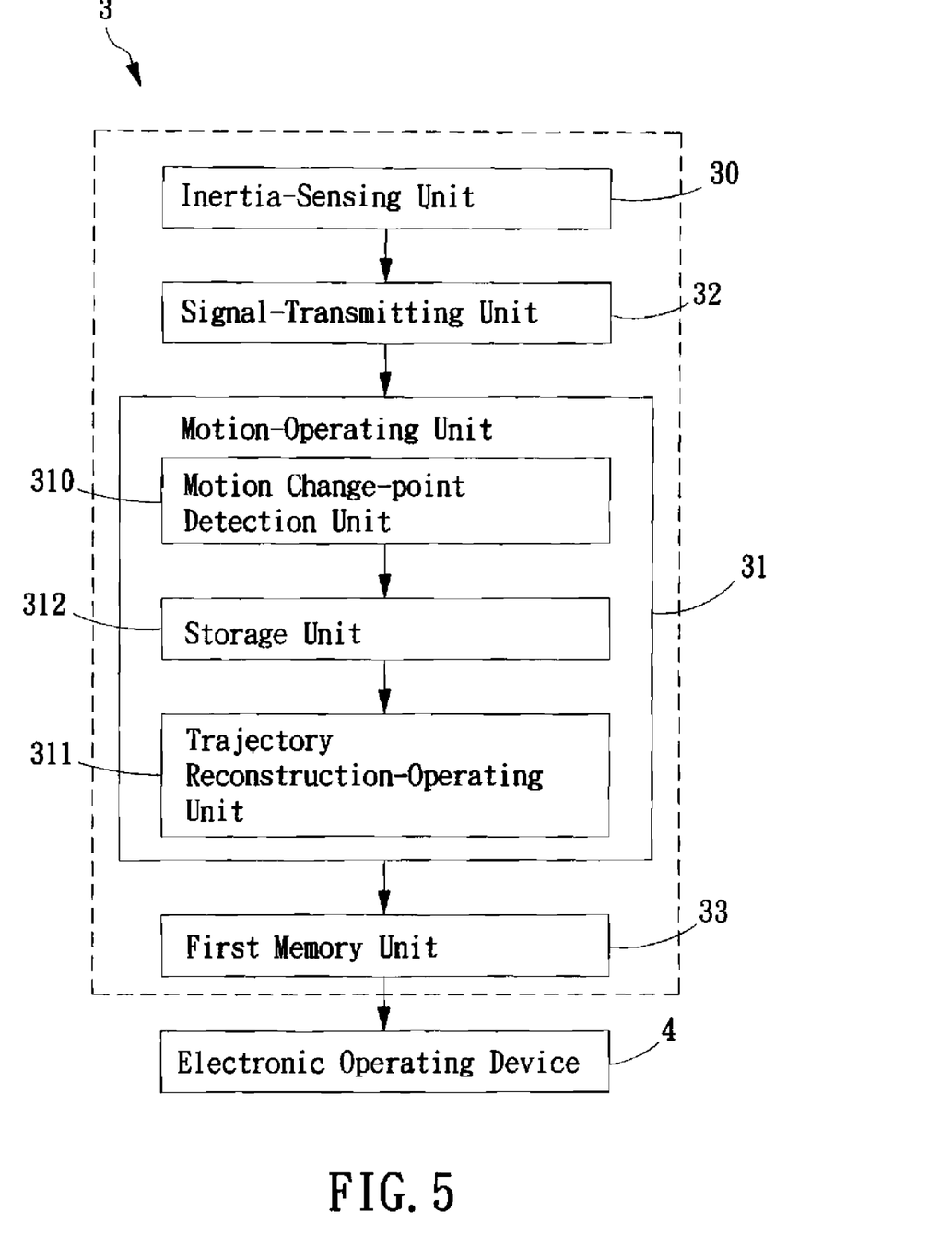
FIG. 5 is a block diagram of an inertia-sensing and trajectory-reconstruction device according to another embodiment of the present invention.

Please refer to FIG. 5, which is a block diagram of an inertia-sensing and trajectory-reconstruction device according to another embodiment of the present invention. The present embodiment is similar to the embodiment in FIG. 4 except that, in the present embodiment, the inertia-sensing and trajectory-reconstruction device 3 is not used in character recognition. The inertia-sensing and trajectory-reconstruction device 3 is coupled to an electronic operating device 4. The electronic operating device 4 is exemplified by, but not limited to, a computer, a workstation or a server with operation and multi-media display. In the present embodiment, the inertia-sensing and trajectory-reconstruction device is not necessarily a handwriting pen. Instead, the inertia-sensing and trajectory-reconstruction device can be a structure capable of being attached onto the human body (for example: the hand or the leg or the waist) to detect the motion signal generated by the user when he is in motion. The motion signal is then processed and recognized by the steps in the method in FIG. 1A or FIG. 2. The electronic operating device 4 is capable of accessing information of the reconstruction trajectory stored in the first memory unit 33 to perform recognition. Trajectory recognition can be used to identify the motion of an athlete. For example, in baseball, pitching or swinging can be detected to acquire the trajectory by the inertia-sensing device. Therefore, in Step 25, the trajectory can be compared with ideal pitching or swinging so that the athlete can modify the pitching or swinging in real-time to improve his performance. Alternatively, in other sports (such as basketball, golf or gymnastics, but not limited thereto) or occasions wherein the trajectory can be used to evaluate the motion (such as digital movies wherein virtual animation production is achieved by constructing the 3-D trajectory of physical objects or physiotherapy wherein 3-D trajectory of human motions is used for rehabilitation analysis and artificial joint design), the flowchart in FIG. 2 of the present invention can be used for motion analysis and determination.

Accordingly, the present invention discloses a real-time motion recognition method and an inertia-sensing and trajectory-reconstruction device using the angular velocity to identify whether the device is in motion to further determine the motion trajectory for character recognition and motion analysis. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A real-time motion recognition method, comprising steps of:
   acquiring an angular velocity signal generated according to a motion of an inertia-sensing device;
   comparing the angular velocity signal with a threshold range; and
   determining the inertia-sensing device is in motion if the angular velocity signal exceeds the threshold range.

2. The real-time motion recognition method as recited in claim 1, wherein the angular velocity signal is a tri-axial angular velocity signal.

3. The real-time motion recognition method as recited in claim 1, further comprising a step of detecting a reference value before acquiring the angular velocity signal.

4. The real-time motion recognition method as recited in claim 3, wherein the reference value is obtained by averaging angular velocity signals acquired over a certain period of time.

5. The real-time motion recognition method as recited in claim 3, wherein the threshold range is the reference value plus or minus a specific value.

6. The real-time motion recognition method as recited in claim 1, wherein the angular velocity signal is obtained by averaging angular velocity signals acquired over a certain period of time.

7. The real-time motion recognition method as recited in claim 1, further comprising a step of recording a motion state signal while the inertia-sensing device is in motion.

8. The real-time motion recognition method as recited in claim 7, further comprising a step of performing trajectory reconstruction on the motion state signal.

9. The real-time motion recognition method as recited in claim 8, further comprising a step of performing character recognition on a reconstructed trajectory.

10. The real-time motion recognition method as recited in claim 8, further comprising a step of performing operator motion recognition on the reconstructed trajectory.

11. An inertia-sensing and trajectory-reconstruction device, comprising:
    an inertia-sensing unit, capable of detecting an acceleration signal on at least one axis and an angular velocity signal on at least one axis; and
    a motion-operating unit, electrically connected to the inertia-sensing unit, the motion-operating unit further comprising:
    a motion change-point detection unit, determining whether the inertia-sensing and trajectory-reconstruction device is in motion according to the angular velocity signal on at least one axis; and
    a trajectory reconstruction-operating unit, capable of performing trajectory reconstruction to construct a trajectory according to the acceleration signal on at least one axis detected by the inertia-sensing unit while the inertia-sensing and trajectory-reconstruction device is in motion.

12. The inertia-sensing and trajectory-reconstruction device as recited in claim 11, wherein the inertia-sensing unit comprises at least an accelerometer and at least an angular velocity sensor.

13. The inertia-sensing and trajectory-reconstruction device as recited in claim 12, wherein the angular velocity sensor is a gyro-sensor.

14. The inertia-sensing and trajectory-reconstruction device as recited in claim 13, wherein the gyro-sensor is capable of identifying whether the inertia-sensing and trajectory-reconstruction device is in motion.

15. The inertia-sensing and trajectory-reconstruction device as recited in claim 12, wherein the accelerometer is capable of detecting the trajectory while the inertia-sensing and trajectory-reconstruction device is in motion.

16. The inertia-sensing and trajectory-reconstruction device as recited in claim 11, wherein the motion-operating unit is connected to a storage unit for recording the acceleration signal and the angular velocity signal.

17. The inertia-sensing and trajectory-reconstruction device as recited in claim 11, further comprising a first memory unit for recording the trajectory.

18. The inertia-sensing and trajectory-reconstruction device as recited in claim 11, further comprising a recognition unit capable of recognizing a character corresponding to the trajectory.

19. The inertia-sensing and trajectory-reconstruction device as recited in claim 18, further comprising a display unit capable of displaying the recognized character.

20. The inertia-sensing and trajectory-reconstruction device as recited in claim 19, wherein the display unit is disposed on a housing of the inertia-sensing and trajectory-reconstruction device.

21. The inertia-sensing and trajectory-reconstruction device as recited in claim 18, further comprising a second memory unit for recording the recognized character.

22. The inertia-sensing and trajectory-reconstruction device as recited in claim 11, further connected to an electronic operating device capable of comparing the trajectory and a specific trajectory.

* * * * *